United States Patent
Mori et al.

[11] Patent Number: 5,947,687
[45] Date of Patent: Sep. 7, 1999

[54] GAS TURBINE MOVING BLADE

[75] Inventors: Masahiko Mori; Yukihiro Hashimoto; Hiroji Tada; Ichiro Fukue; Keizo Tsukagoshi; Jyunichiro Masada, all of Takasago, Japan

[73] Assignee: Mitsubishi Heavy Industries, Ltd., Tokyo, Japan

[21] Appl. No.: 08/862,135

[22] Filed: May 22, 1997

[51] Int. Cl.⁶ .................................................... F01D 5/18
[52] U.S. Cl. ..................................... 416/193 A; 416/96 R
[58] Field of Search ............................ 416/193 A, 96 R, 416/96 A, 97 R; 415/115, 116

[56] References Cited

U.S. PATENT DOCUMENTS

| | | | |
|---|---|---|---|
| 5,348,446 | 9/1994 | Lee et al. | 416/97 R |
| 5,387,086 | 2/1995 | Frey et al. | 416/97 R |
| 5,536,143 | 7/1996 | Jacala et al. | 416/97 R |
| 5,695,322 | 12/1997 | Jacobson et al. | 416/97 R |

FOREIGN PATENT DOCUMENTS

| | | |
|---|---|---|
| 54-150508 | 11/1979 | Japan. |
| 3-149301 | 6/1991 | Japan. |

*Primary Examiner*—Edward K. Look
*Assistant Examiner*—Richard Woo
*Attorney, Agent, or Firm*—Wenderoth, Lind & Ponack, L.L.P.

[57] ABSTRACT

A movable gas turbine blade includes a platform (10) which is provided with a groove (15). The groove is located on a blade trailing side of the platform. Also, the groove is rounded and has a depth which does not enter a stress line of the platform caused by a load on the blade. The groove functions to suppress a high thermal stress arising at a connection portion of a blade trailing edge and the platform of the gas turbine air cooled moving blade during unsteady (start and stop) operation of the turbine.

3 Claims, 7 Drawing Sheets

GAS TURBINE MOVING BLADE

BACKGROUND OF THE INVENTION

1. Field of the Invention

The present invention relates to a gas turbine moving blade of a gas turbine plant or a jet engine.

2. Description of the Prior Art

A gas turbine is constructed, as shown in FIGS. 5-6, so that air is compressed at a compressor 1 and fuel is fed into a combustor 2 to generate a combustion gas. The combustion gas is introduced into a turbine portion 3 to rotate a generator 4. The turbine portion 3 includes a stationary blade 5 and a moving blade 6. The moving blade 6 is an air cooled type for resisting a high temperature gas from the combustor 2.

FIG. 7 is a longitudinal cross sectional view showing one example of a prior art air cooled moving blade. FIG. 8 is a horizontal cross sectional view of the moving blade shown in FIG. 7. FIG. 9 is a perspective view of the moving blade, and FIG. 10 is a perspective view of same, as seen from another direction of FIG. 9 and partly cut out horizontally. High pressure air 7, discharged from the compressor 1, is introduced from a blade root bottom portion 8 of the air cooled blade 6. The high pressure air, after cooling a shank portion 9, a platform 10 and a blade profile portion 11, flows out of fine holes 12 provided at a blade face or out of fine holes 13 provided at a blade tip portion. Also, a pin fin portion 14 is provided at a blade trailing edge portion. Thus, such structure is capable of cooling the metal temperature of the moving blade.

In the prior art air cooled moving blade, there is a large difference in mass (thickness) between the shank portion, the platform and the blade profile portion. Nevertheless, at the time of steady operation, there occurs no large temperature difference between the platform and the blade profile portion and thus the thermal stress is also small. However, at a time of unsteady operation, such as stopping etc., the temperature of the blade profile portion goes down quickly, while the platform, due to its mass, takes longer for the temperature to fall. Thus, a large temperature difference occurs between the portions so that a very large thermal stress is created due to the temperature difference. A severe stress occurs at the connection portion between the blade trailing edge and the platform. Therefore, a construction for preventing a high thermal stress from occurring during unsteady or intermittent operation (start and stop) is necessary at the connection portion of the blade trailing edge and the platform.

SUMMARY OF THE INVENTION

In order to solve problems in the prior art, the present invention provides a gas turbine moving blade in which a roundish groove is provided in an area, not contacting a high temperature gas, of an end face on a blade trailing edge side of a platform. The area extends along a circumferential direction crossing a rotational axis rectangularly, and has a depth which does not enter a stream of a stress line of the blade load.

Further, the present invention provides a gas turbine moving blade in which the groove is provided at a portion on a blade profile portion side of the platform.

According to the present invention, a roundish groove is provided in an area, not contacting a high temperature gas, of an end face of a blade trailing edge side of a platform along a circumferential direction crossing a rotational axis rectangularly. A small mass on the platform downstream side is exposed to the high temperature gas, and therefore the temperature difference between a profile portion on the blade trailing edge side and the platform downstream side during unsteady operation (start and stop) becomes smaller than in the prior art and thus a thermal stress also becomes smaller. Further, as the rigidity of the platform downstream side is largely reduced by providing the groove, a thermal deformation difference on the platform downstream side becomes avoidable and a large thermal stress can be prevented from occurring. Also, as a depth of the groove provided on the platform downstream side is set so as to not enter a stress line area caused by the blade load. Thus, no large stresses occur at a groove bottom portion even with a load due to a centrifugal force of the blade.

DESCRIPTION OF THE PREFERRED EMBODIMENTS

Figure 1:
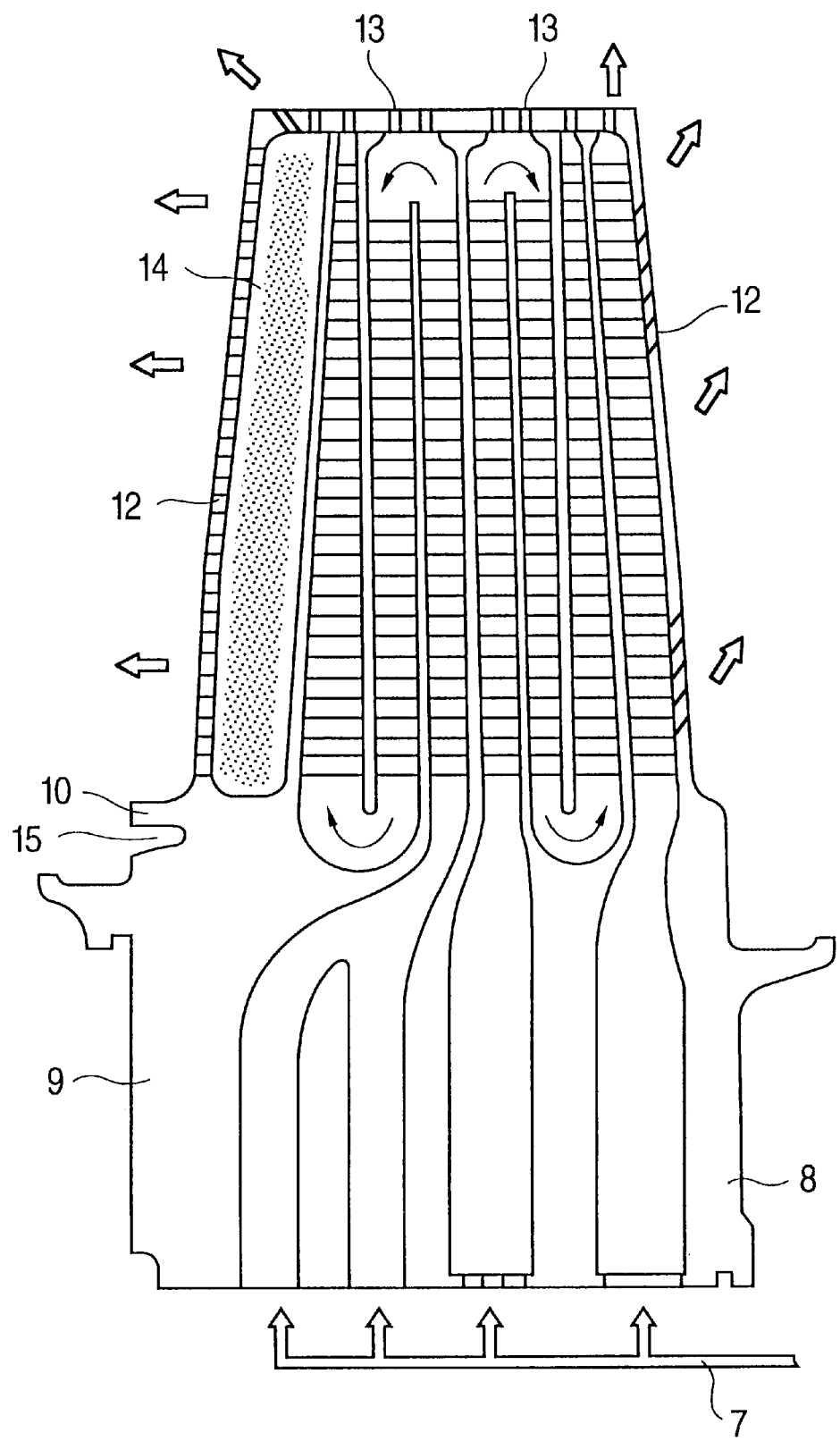
FIG. 1 is a longitudinal cross sectional view showing one preferred embodiment according to the present invention.
Figure 2:
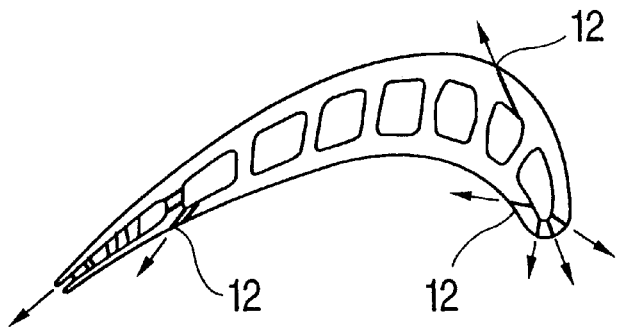
FIG. 2 is a horizontal cross sectional view of the embodiment illustrated in FIG. 1.
Figure 3:
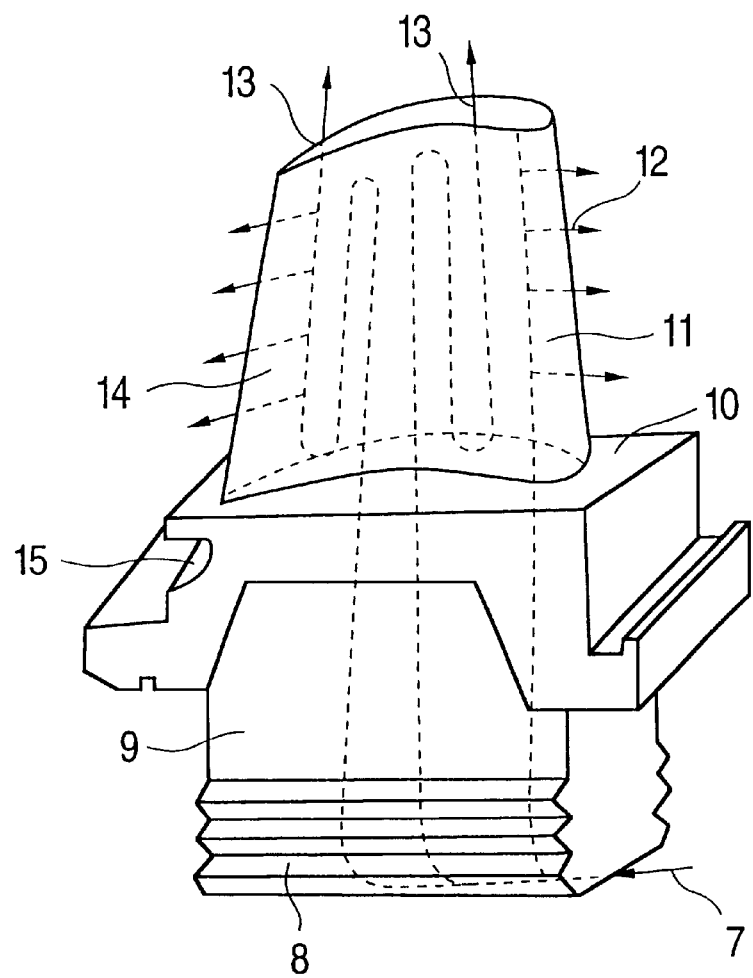
FIG. 3 is a perspective view of the embodiment illustrated in FIG. 1.
Figure 4:
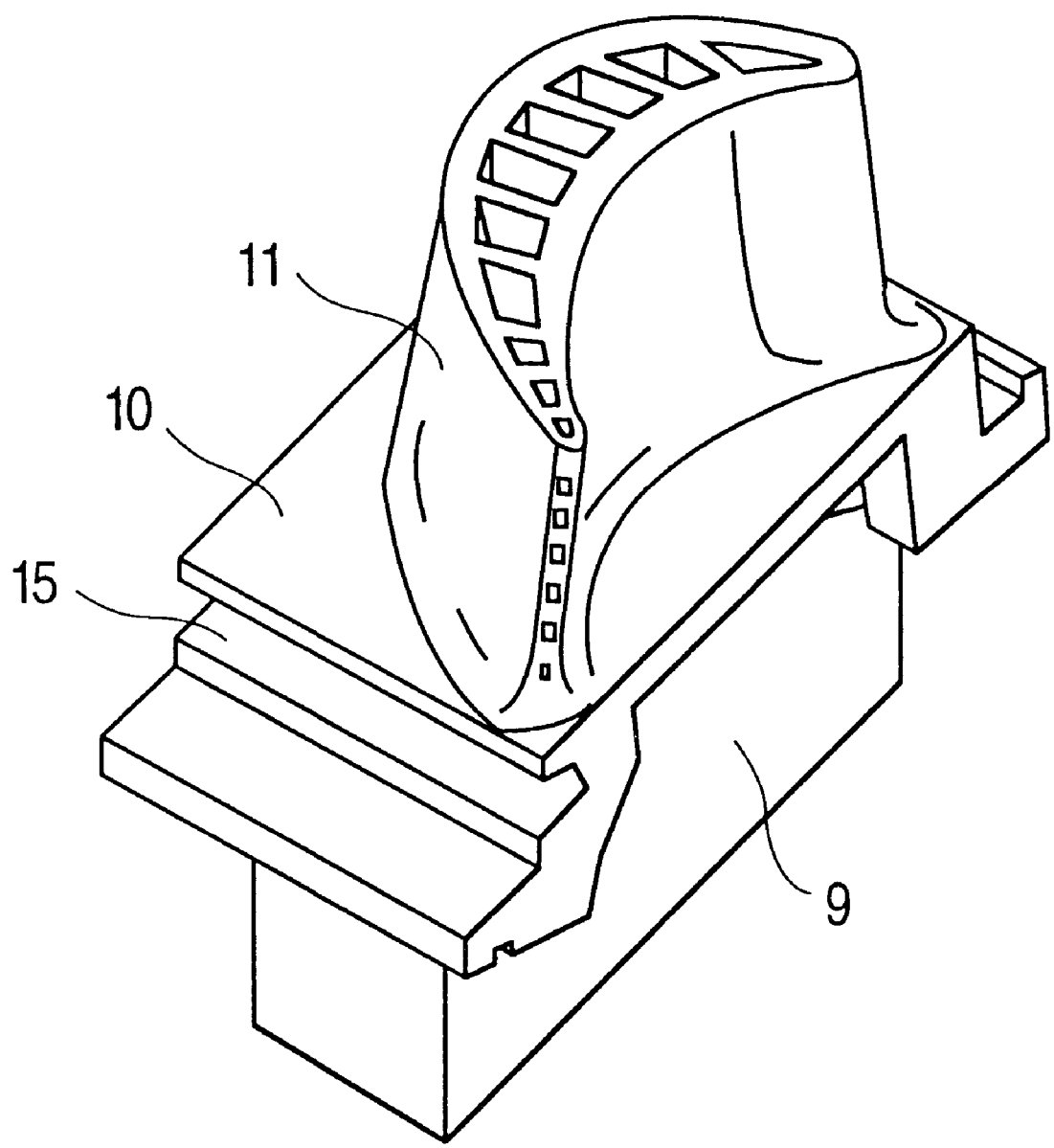
FIG. 4 is a perspective view of the embodiment illustrated in FIG. 1 as seen from another direction relative to that of FIG. 3 and partly cut out horizontally.
Figure 5:
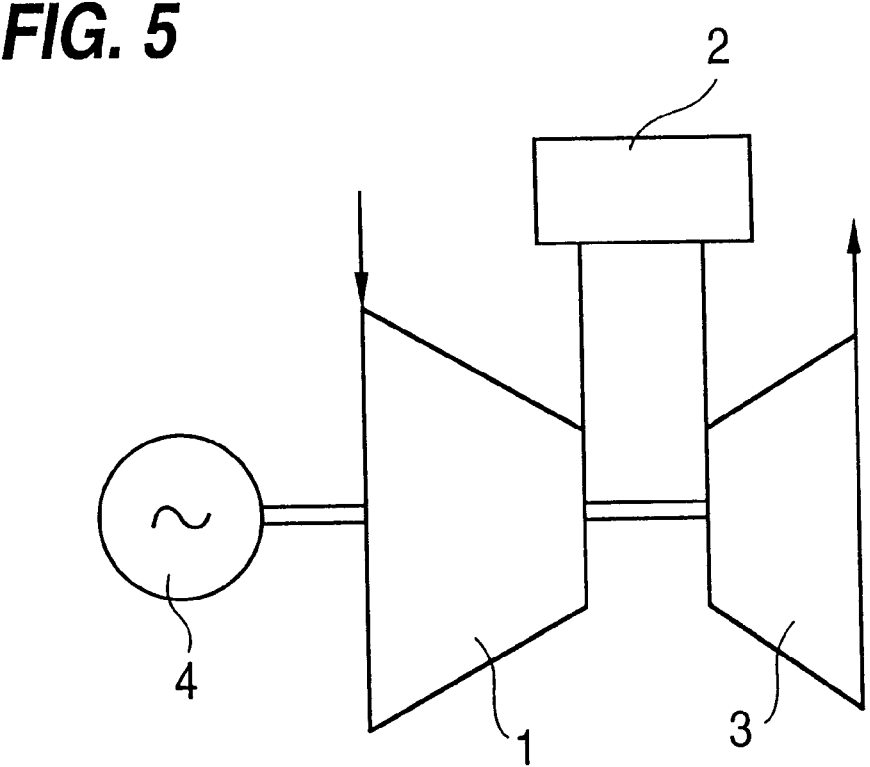
FIG. 5 is a view showing a general construction of a gas turbine.
Figure 6:
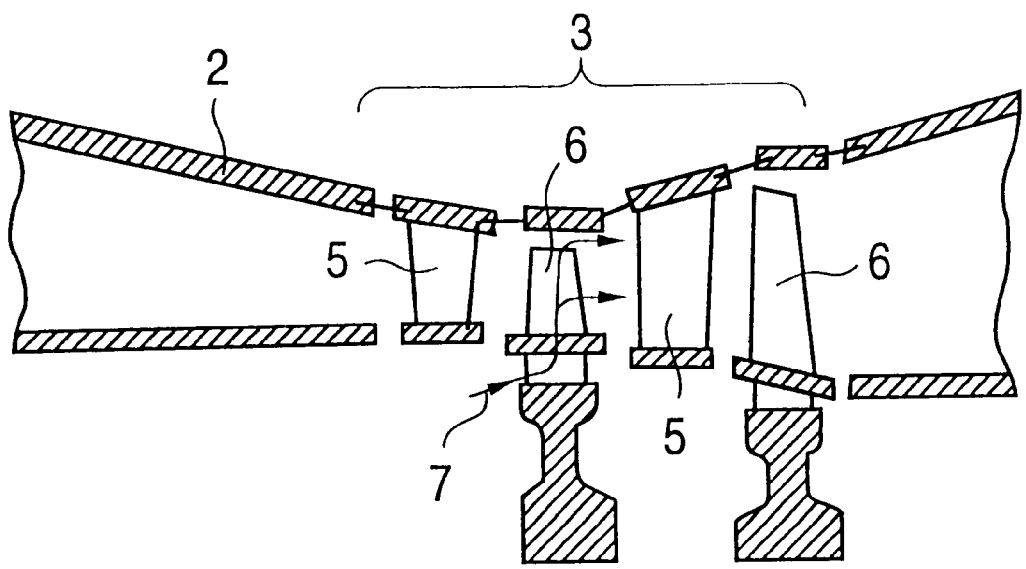
FIG. 6 is a view showing a general construction of a turbine portion of a gas turbine.
Figure 7:
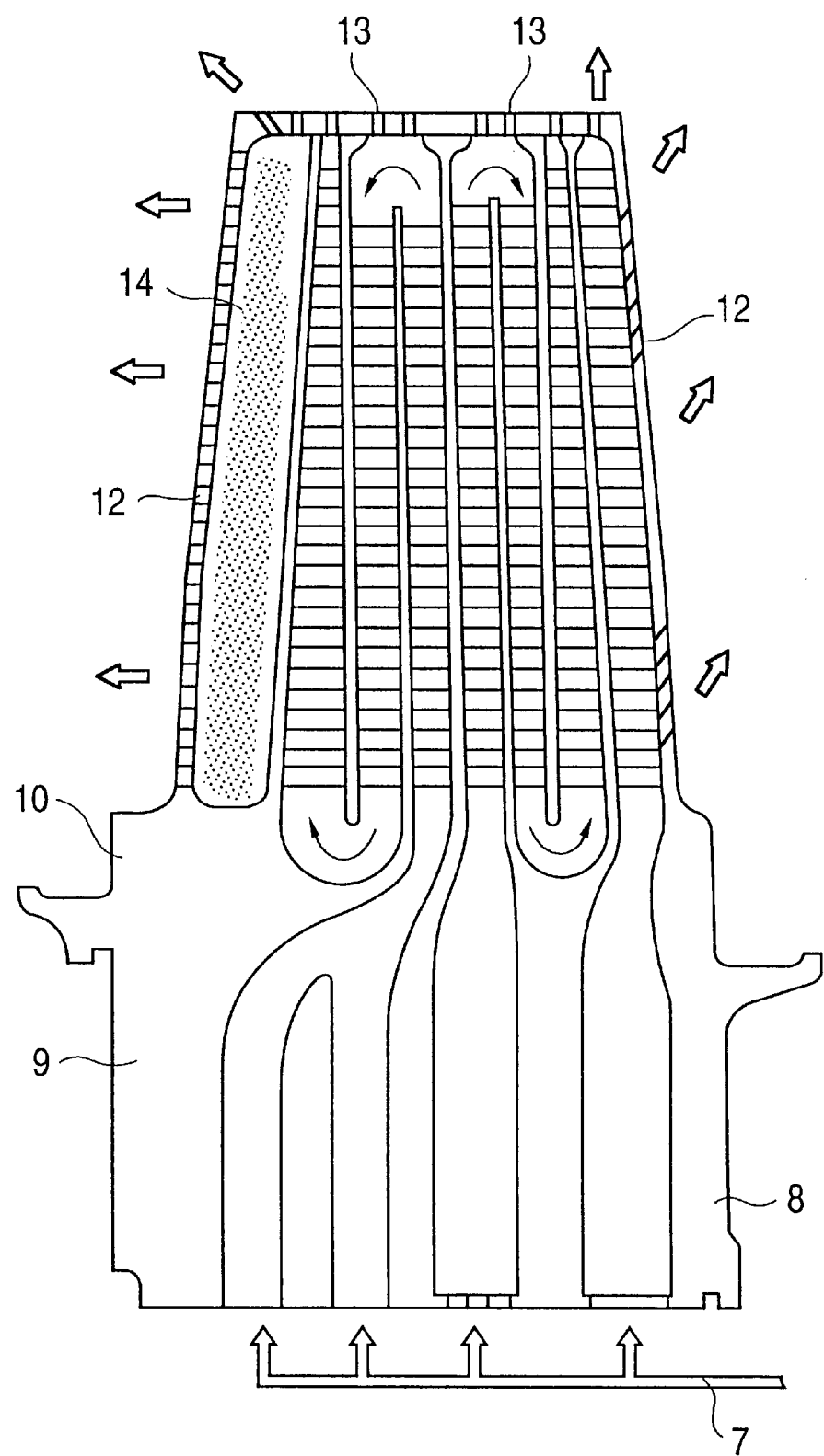
FIG. 7 is a longitudinal cross sectional view showing one example of a prior art air cooled moving blade.
Figure 8:
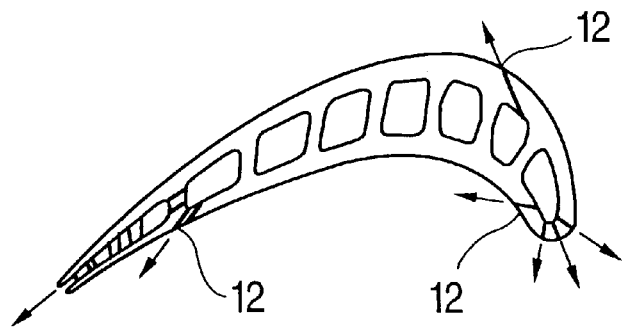
FIG. 8 is a horizonal cross sectional view of the prior art air cooled moving blade.
Figure 9:
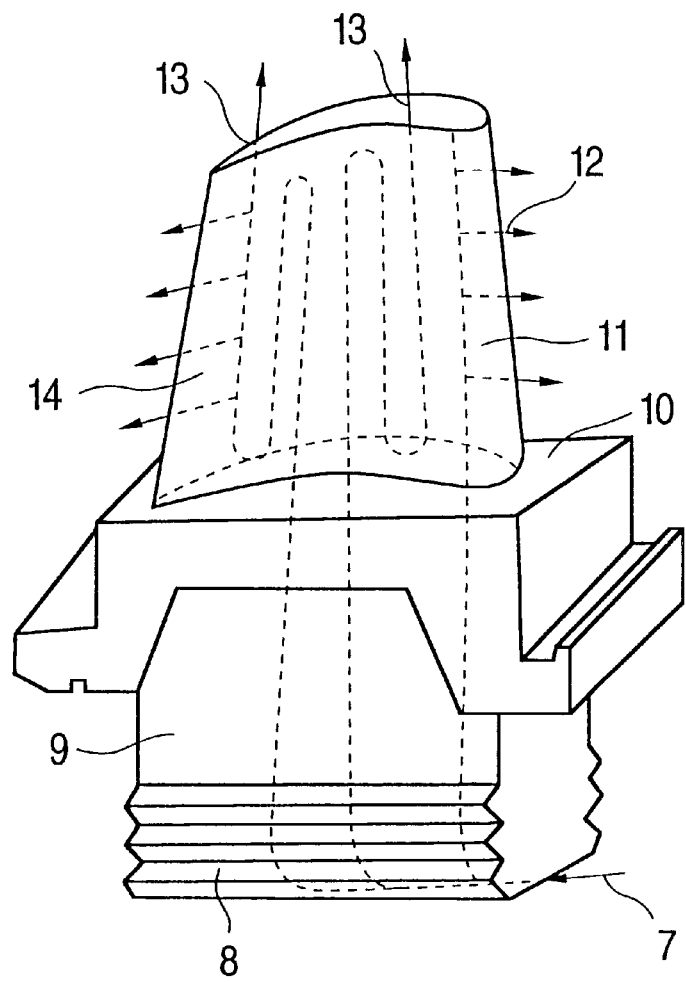
FIG. 9 is a perspective view of the prior art air cooled moving blade.
Figure 10:
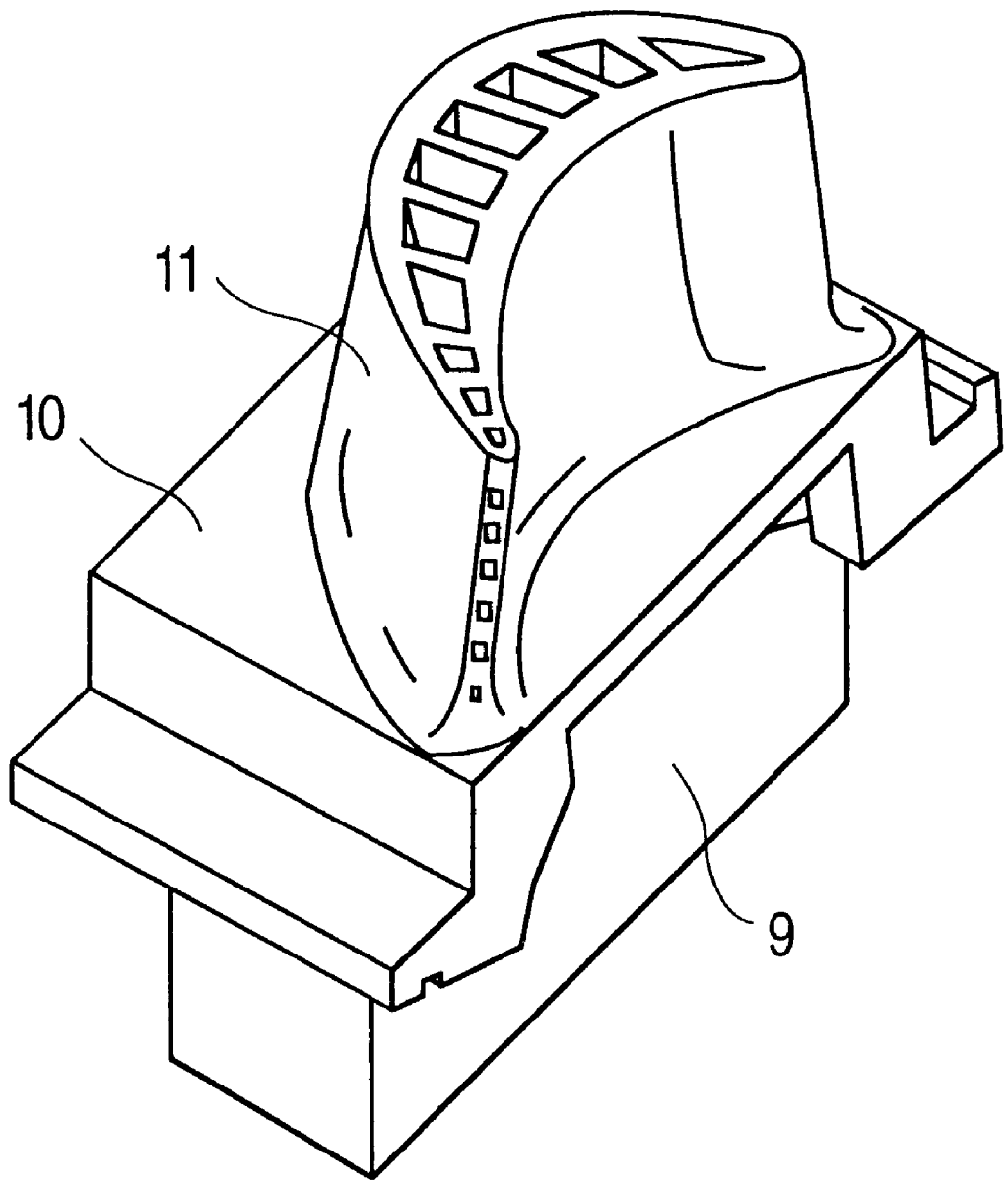
FIG. 10 is a perspective view of the prior art air cooled moving blade as seen from another direction relative to that of FIG. 9 and partly cut out horizontally.

FIG. 1 is a longitudinal cross sectional view showing one preferred embodiment according to the present invention. FIG. 2 is a horizontal cross sectional view of the embodiment of FIG. 1. FIG. 3 is a perspective view of the embodiment of FIG. 1, and FIG. 4 is a perspective view thereof as seen from another direction relative to that of FIG. 3 and partly cut out horizontally.

As mentioned above, a high temperature combustion gas supplied from a combustor 2 works at a turbine portion 3. The turbine portion 3 includes a stationary blade 5 and a moving blade 6. High pressure air 7, discharged from a compressor 1, is introduced from a blade root bottom portion 8 of the air cooled moving blade 6 so that the blade can resist the high temperatures of the gas supplied from the combustor. The cooling air, after cooling a shank portion 9, a platform 10 and a blade profile portion 11, flows out of fine holes 12 provided at a blade face or out of fine holes 13 provided at a blade tip portion. Also, a pin fin portion 14 is provided at a blade trailing edge portion, and is employed to obtain a cooling effect for suppressing elevation of metal temperature of the moving blade.

If the platform 10 and the blade profile portion 11 are compared with each other, the platform 10 is thicker, and hence in this preferred embodiment, a roundish groove 15 is provided on a downstream side of the platform. The groove 15 extends along a circumferential direction crossing a rotational axis rectangularly. The groove has a depth which does not enter a stream of a stress line caused by the blade load. Thereby, the mass on the platform downstream side is reduced and rigidity on the platform downstream side is largely reduced as well. It is practical that the groove 15 is provided at a portion on the blade profile portion side of the platform 10, as shown in FIGS. 1 and 3.

In the prior art air cooled moving blade, as there is a large difference in mass (thickness) between the blade trailing edge profile portion and the platform downstream side, there occurs a large temperature difference between the blade trailing edge profile portion and the platform downstream side during unsteady or intermittent operation (start and stop) so that a large thermal stress arises at a connection portion of the blade trailing edge and the platform. There is a fear of crack initiation due to the large stress.

In the present invention, a roundish groove is provided on a platform downstream side along a circumferential direction crossing a rotational axis rectangularly. The groove has a depth which will not enter a stream of a stress line created by the blade load. Thereby, mass (thickness) of the platform downstream side, which is exposed to a high temperature gas, is reduced so that temperature differences during unsteady operation is reduced relative to the prior art structures. Also, since rigidity of the platform downstream side is largely reduced, a thermal deformation difference of the blade trailing edge and the platform downstream side becomes avoidable and therefore a large thermal stress at a connection portion of the blade trailing edge and the platform can be prevented.

While the preferred form of the present invention has been described, variations thereof will occur to those skilled in the art within the scope of the present inventive concepts which are delineated by the following claims.

What is claimed is:

1. A gas turbine blade comprising:
   a blade platform having a blade trailing side and a blade leading side;
   a blade profile portion connected to said blade platform;
   a groove formed only in said blade trailing side of said blade platform, said groove being rounded and extending in a circumferential direction across said blade trailing side, wherein said groove has a depth which does not extend into a line of stress created by a blade load, and said groove is located in an end face of said blade platform, at said blade trailing side, in an area which is not exposed to high temperature combustion gas.

2. The gas turbine blade as claimed in claim 1, further comprising a blade shank portion connected to said platform and a blade root portion connected to said blade shank portion, wherein each side of said blade platform, except the blade trailing side, defines a continuous planar surface.

3. The gas turbine blade as claimed in claim 1, wherein said groove extends along a circumferential direction crossing a rotational axis rectangularly and is effective to reduce the mass of said platform.

* * * * *